US012795706B2

(12) United States Patent
Zhou et al.

(10) Patent No.: US 12,795,706 B2
(45) Date of Patent: Nov. 10, 2026

(54) ULTRA-RELIABLE LOW LATENCY COMMUNICATIONS (URLLC)-AWARE TRIGGERED DYNAMIC GRANT

(71) Applicant: AT&T Intellectual Property I, L.P., Atlanta, GA (US)

(72) Inventors: Jianchun Zhou, Bellevue, WA (US); Yakun Gao, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 427 days.

(21) Appl. No.: 18/505,175

(22) Filed: Nov. 9, 2023

(65) Prior Publication Data

US 2025/0159708 A1 May 15, 2025

(51) Int. Cl.

*H04W 72/512* (2023.01)
*H04L 1/00* (2006.01)
*H04W 72/1268* (2023.01)
*H04W 72/543* (2023.01)

(52) U.S. Cl.

CPC ......... *H04W 72/512* (2023.01); *H04L 1/0003* (2013.01); *H04W 72/1268* (2013.01); *H04W 72/543* (2023.01)

(58) Field of Classification Search

CPC ........... H04W 72/512; H04W 72/1268; H04W 72/543; H04W 72/115; H04L 1/0003

See application file for complete search history.

(56) References Cited

U.S. PATENT DOCUMENTS

2018/0324768 A1* 11/2018 Shaheen ............... H04L 5/0053
2020/0196348 A1* 6/2020 Fan ................... H04W 72/1268
2020/0351932 A1* 11/2020 Tsai ...................... H04L 1/0038
2024/0414593 A1* 12/2024 Lyu ....................... H04W 28/10

OTHER PUBLICATIONS

"On Using Deep Reinforcement Learning to reduce Uplink Latency for uRLLC services", Bagaa, M, Ksentini, A, and Boutiba K, IEEE, 2022 (Year: 2022).*

(Continued)

*Primary Examiner* — Habte Mered
(74) *Attorney, Agent, or Firm* — Guntin & Gust, PLC; Bryan S. Latham

(57) ABSTRACT

Aspects of the subject disclosure may include, for example, receiving, from a user equipment (UE) device, a scheduling request for a configured grant operation during performance of an ultra-reliable low latency communications (URLLC) service at the UE device, determining radio channel characteristics of a radio channel of the UE device, and determining an appropriate modulation and coding scheme for a dynamic configured grant for the UE device, wherein the appropriate modulation and coding scheme is selected based on the radio channel characteristics. Aspects of the disclosure further include communicating information about the dynamic configured grant to the UE device, including communicating an assigned modulation and coding scheme to the UE device for use during performance of the URLLC service at the device, and suspending further scheduling requests for additional dynamic configured grants during completion of the URLLC service at the device. Other embodiments are disclosed.

20 Claims, 7 Drawing Sheets

(56) References Cited

OTHER PUBLICATIONS

Gerami, Majid , et al., "Configured Grant for Ultra-Reliable and Low-Latency Communications: Standardization and Beyond", 13 pages.

Larrañaga, Ana , et al., "5G NR Configured Grant in ns-3 Network Simulator for Ultra-Reliable Low Latency Communications", ScienceDirect; Procedia Computer Science 201, 2022, 8 pages.

Le, Trung-Kien , et al., "Enhancing URLLC Uplink Configured-grant Transmissions", 5 pages.

* cited by examiner

200

300

600

ULTRA-RELIABLE LOW LATENCY COMMUNICATIONS (URLLC)-AWARE TRIGGERED DYNAMIC GRANT

FIELD OF THE DISCLOSURE

This disclosure relates generally to mobile communications. This disclosure relates more particularly to ultra-reliable, low-latency communications in a mobile communications system.

BACKGROUND

Fifth Generation (5G) mobile communications provides substantial capabilities. Among these are mobile broadband communications, massive machine-type communications (MTC) and Ultra-reliable low latency communications (URLLC). Improving and optimizing these capabilities are a focus or current development.

BRIEF DESCRIPTION OF THE DRAWINGS

Reference will now be made to the accompanying drawings, which are not necessarily drawn to scale, and wherein.

DETAILED DESCRIPTION

Figure 1:
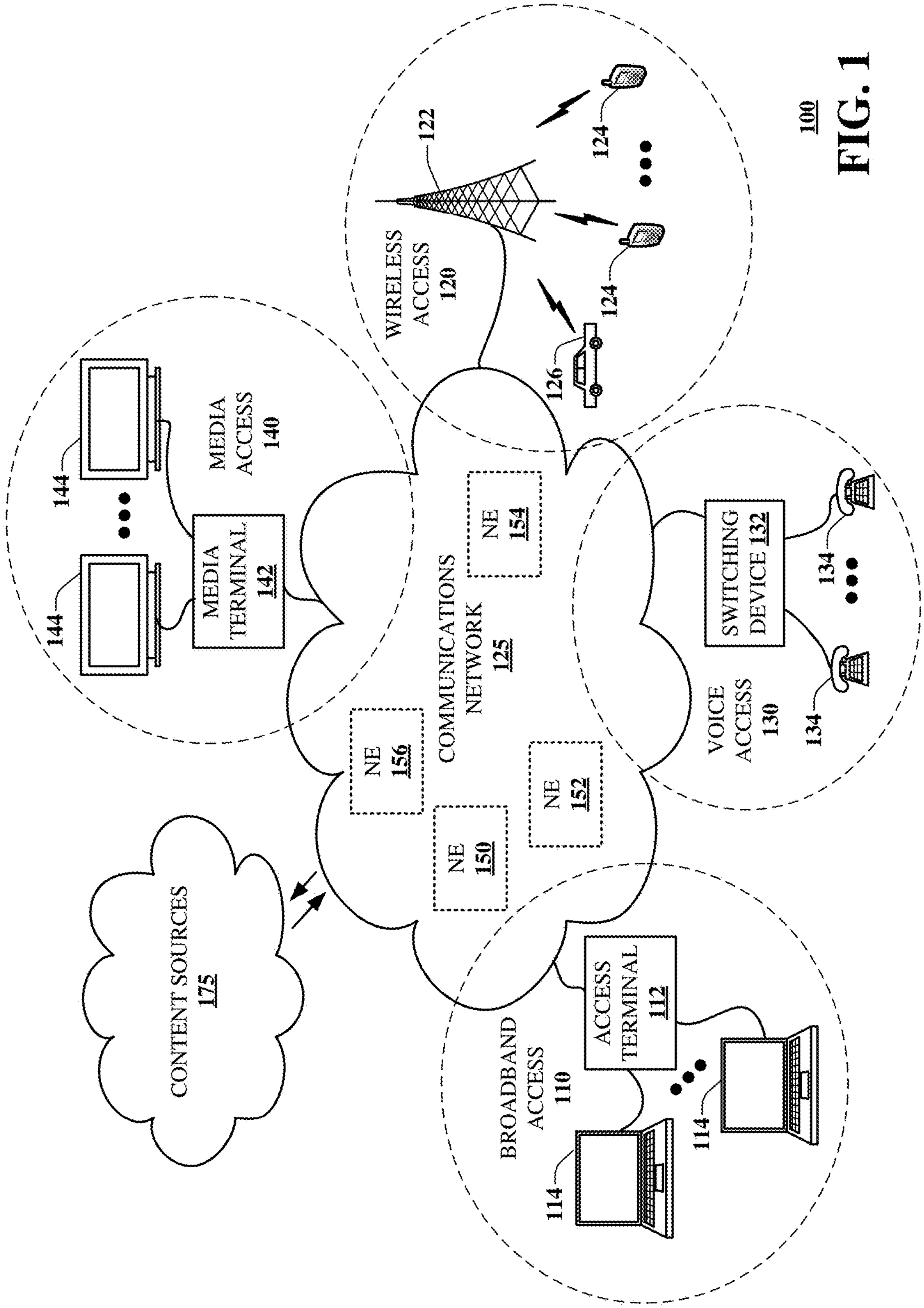
FIG. 1 is a block diagram illustrating an exemplary, non-limiting embodiment of a communications network in accordance with various aspects described herein.

The subject disclosure describes, among other things, illustrative embodiments for providing ultra-reliable low latency communications (URLLC). A mobile device associated with equipment seeking to perform a URLLC service transmits an initial scheduling request (SR) and a buffer status report (BSR), and the network will transmit to the UE an initial Downlink Control Information (DCI) response to configure the grant to satisfy the data rate and latency required by the particular URLLC service. Therefore, the UCG will not be a fixed grant and will vary from one URLLC service to another. Once the URLCC traffic starts, the UE will skip further SR and BSR messages until the URLLC service is complete and there will be no additional DCI from the network. For a stationary UE providing the URLLC service, the UE and network use the time during the initial SR, BSR and DCI response procedure to measure radio condition and assign the most appropriate Modulation Code Scheme (MCS) to achieve significantly higher throughput than in conventional usage. For a mobile UE providing the URLLC service, the network assigns a relatively conservative MCS such as 3 points lower than the measured, appropriate value in order to mitigate incurring retransmission from the UE while not largely impacting the user throughput. Other embodiments are described in the subject disclosure.

One or more aspects of the subject disclosure include receiving, from a user equipment (UE) device, a scheduling request for a configured grant operation during performance of an ultra-reliable low latency communications (URLLC) service at the UE device, determining radio channel characteristics of a radio channel of the UE device, and determining an appropriate modulation and coding scheme for a dynamic configured grant for the UE device, wherein the appropriate modulation and coding scheme is selected based on the radio channel characteristics. Aspects of the disclosure further include communicating information about the dynamic configured grant to the UE device, including communicating an assigned modulation and coding scheme to the UE device for use during performance of the URLLC service at the device, and suspending further scheduling requests for additional dynamic configured grants during completion of the URLLC service at the device.

One or more aspects of the subject disclosure include identifying a start of provision of an ultra-reliable low latency communications (URLLC) service at equipment associated with a UE device, the UE device in radio communication with a network, receiving, from the UE device over a radio link, a buffer status report and a scheduling request for a dynamic configured grant for extended uplink communication from the UE device to the network, suspending communication of further buffer status report messages and further scheduling request messages during provision of the URLLC service at the equipment associated with the UE device, and determining an appropriate modulation and coding scheme for the dynamic configured grant for the UE device, wherein the appropriate modulation and coding scheme is selected based on radio channel characteristics of the radio link. Aspects of the disclosure further include communicating, to the UE device, information about a data rate and a latency for use on uplink communications during the dynamic configured grant, including communicating an assigned modulation and coding scheme to the UE device for use during performance of the URLLC service at the equipment associated with the UE device.

One or more aspects of the subject disclosure include initiating a start of provision of an ultra-reliable low latency communications (URLLC) service at equipment associated with a UE device, the UE device in radio communication with a network, communicating from the UE device over a radio link to a network device, a scheduling request for a dynamic configured grant for extended uplink communication from the UE device to the network during the provision of the URLLC service at the equipment associated with the UE device, receiving at the UE device, information about a data rate and a latency for use on uplink communications over the radio link during the dynamic configured grant, including receiving an assigned modulation and coding scheme for the UE device for use during performance of the URLLC service at the equipment associated with the UE device, wherein the assigned modulation and coding scheme is selected based on current radio characteristics of the radio link, and communicating on an uplink to the network device over the radio link according to the information about a data rate and a latency, during the provision of the URLLC services at the equipment associated with the UE device.

Referring now to FIG. 1, a block diagram is shown illustrating an example, non-limiting embodiment of a system 100 in accordance with various aspects described herein. For example, system 100 can facilitate in whole or in part providing URLLC services using a mobile device operating in the system 100. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Fifth generation (5G) New Radio (NR) communications networks for mobility feature new and expanded capabilities. For example, enhanced mobile broadband (eMBB) communications and massive machine-type communications (mMTC) were developed for a previous generation, LTE or fourth generation (4G) mobility networks. The capabilities of these were enhanced for extension to 5G.

Further, ultra-reliable low latency communications (URLLC) capabilities have been newly developed for 5G networks. In the context of data communications, reliability refers to how well a system can deliver information dependably and accurately. Reliability may be expressed as a ratio of bits or bytes that are correctly received to bits or bytes that are transmitted, or as a bit error rate (BER). Latency refers to the time required for a packet of data to be sent from one network location to another, or to make a round trip from a source to a destination and back to the source. Latency may be measured in milliseconds (ms). Latency is one key performance indicator (KPI) of a network. Lower latency refers to faster data transfer and, generally, a better user experience.

URLLC presents a new category of delay-critical services introduced in 5G. Applications for URLLC services include discrete automation, intelligent transport systems, telemedicine, autonomous vehicles and Vehicle to Everything (V2X) services. Such applications may need to support end-to-end latencies as low as 5 ms and the delay budget for individual interfaces can be as low as 1 ms.

URLCC is defined according to standards published by the 3$^{rd}$ Generation Partnership Project (3GPP) which has defined specific 5G quality of service (QoS) Identifier (5QI) values to standardize QoS characteristics. The 5QI value corresponds to a set of QoS characteristics that should be used for the QoS flow. These characteristics include guaranteed and maximum bit rates, priority levels, and limits on latency, jitter, and error rate. The 5QI value is typically a scalar number. Early URLLC services have had diverse requirements on data rate and latency.

Figure 2A:
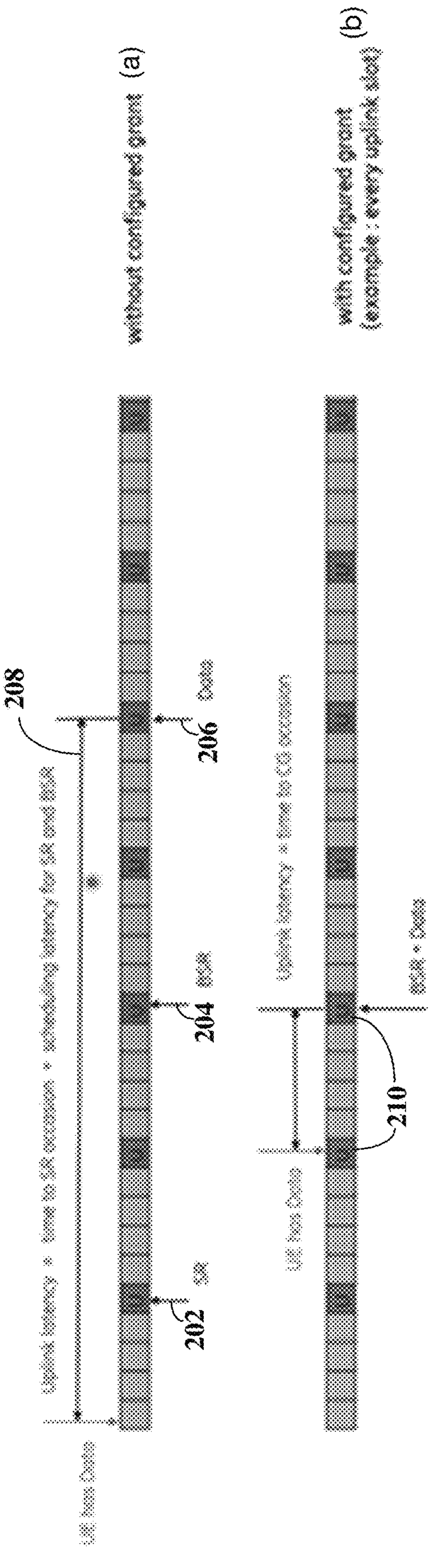
FIG. 2A is a block diagram illustrating example embodiments of a conventional uplink transmission pattern in a mobile communications system which may function, for example, within the communication network of FIG. 1.

FIG. 2A is a block diagram illustrating an example, non-limiting embodiment of a conventional uplink transmission pattern 200 for use in a mobile communications system which may function, for example, within the communications network 125 of FIG. 1. The uplink transmission pattern 200 may particularly apply to 5G networks implementing a configured grant option. The uplink is the radio link from the user equipment (UE) device to a base station, designated as eNodeB, eNB, gNodeB or gNB. In FIG. 2A(a), each four downlink time slots are followed by an uplink time slot in time division duplex (TDD) mode. Each time slot in this example corresponds to 0.5 ms. FIG. 2A(a) illustrates the uplink transmission pattern 200 without configured grant. The uplink transmission pattern 200 includes a sequence of time slots. Time slots designated for uplink transmission are indicated with a U. Similarly, FIG. 2A(b) illustrates the uplink transmission pattern 200 in a case with configured grant. The 5G standard defines the use of configured grant (CG) scheduling for uplink (UL) transmissions that eliminates the need to request and assign resources for each packet transmission by pre-allocating resources to the UE.

In a typical LTE or 5G network, as illustrated in FIG. 2A(a), when the UE has data 206 to transmit on an uplink (UL), the UE must send a Scheduling Request (SR) 202 and a Buffer Status Report (BSR) 204 to the network to reserve resources which are allocated to the UE via Downlink Control Information (DCI) response from the network. The Scheduling Request (SR) generally is a physical layer message by which the UE device asks the network to send an uplink grant so that the UE can transmit on the physical uplink shared channel (PUSCH). The Buffer Status Report (BSR) is a message from the UE to the eNB or gNB advising of an amount of data to be transmitted by the UE and requesting a grant large enough to transmit the data. The Downlink Control Information (DCI) response provides the UE with the necessary information such as physical layer resource allocation and power control commands for both uplink and downlink.

As illustrated in the diagrams of FIG. 2A, the time delay 208 before the UE can transmit a first byte of data 206 can be substantial. In the example, the time delay 208 corresponds to 12 ms before the UE can begin transmitting. The time delay 208 includes the time duration from the presence of data to transmit from the UE device until an uplink time slot when the UE device can send a Scheduling Request (SR) 202, plus the inherent scheduling latency for the SR 202 and the BSR 204. In the example, the UE does not begin transmitting data 206 until several time slots later. This corresponds to the uplink latency and is too great for delay critical URLLC services. As noted, the example time delay or uplink latency is 12 ms. URLLC services may specify a maximum latency of 5 ms or even 2 ms.

To reduce this delay, 3GPP introduced an UL Configured Grant (UCG) feature in the radio network. With this feature, illustrated in FIG. 2A(b), the UE starts sending data right away by omitting the SR, the BSR and a DCI response. Because there is no DCI assignment for the UL grant, the network must configure or reserve the fixed UL resource or grant. When the UE device registers with the network, the network advises the UE of the availability of the configured grant resources. The UCG resources are in effect reserved resources. In the example, two uplink time slots are reserved from every 10 time slots. If the UE device is not a URLLC device, the UE device cannot use the reserved time slots. When the UE has data to transmit, the UE can begin transmitting at the designated UCG timing, at uplink time slots 210. The uplink configured grant time slots 210 are reserved for URLLC use by any UE device. Using the configured grant features, the UE device can begin transmitting 2.5 ms after having data to transmit, saving 10 ms of latency relative to the example of FIG. 2A(a) without configured grant.

However, the defined uplink grant feature has limitations that may limit its utility in many applications. For example, it is very costly to reserve radio resources such as time slots and bandwidth in the network for exclusive use in a configured grant. Once the grant is configured, no other service can use it except URLCC services. To minimize the inefficiency, the network usually schedules one or two Transmission Time Interval slots per system frame. Transmission Time Interval (TTI) is composed of consecutive OFDM symbols in the time domain in a particular transmit direction. By combining different numbers of symbols, different TTI durations are possible. However, the small bandwidth reserved under this approach does not satisfy the need of all URLLC services such as those with large data burst volume, such as 1354 bytes. Therefore, the current UCG solution using statically reserved radio resources creates poor spectrum efficiency. The current solution may provide 1 Mbps throughput on one hand but cannot support the diverse URLLC services that require more than 1 Mbps.

Further, the 3GPP configured grant solution is very static in nature. Timing is fixed. The size of the uplink grant is fixed. Because the UCG is fixed, the resource is always available for use. However, the resource may go unused because of no overall demand or no demand during particular times. If the resource is unused because of lack of demand, it becomes a wasted resource.

Still further, because UCG resources must be reserved, users and applications tend to reserve the resource very little or very rarely. However, when users do reserve the resource but need bigger bandwidth, there is insufficient bandwidth and other resources available for many desired uses and applications.

In addition, the UCG resources must be reserved without any awareness of radio channel conditions between the UE device and the network. In the case of a poor radio environment, with noise or other interference causing, for example, poor bit error rate, network resources for URLLC may be wasted on retransmissions to recover from errors. As a result, 3GPP specifications dictate the most-conservative modulation and coding scheme, MCS of 0, for radio link adaptation in order to avoid the delay caused by potential retransmission in the absence of feedback from UE. The MCS specifies a modulation and a code rate for the uplink and is generally dependent on radio link quality. MCS of 0 or channel quality indicator equaling 0 corresponds to very conservative setting for a poor-quality channel. Higher MCS values provide better throughput, or amount of information communicated per unit of time. In fact, in many cases, channel quality is sufficient to support a more aggressive modulation, coding scheme, or both. It has been empirically observed that MCS values of 10, 15, 18, 22 and better are easily achievable. However, as noted, MCS for UCG in the 5G NR standard is fixed at MCS 0.

In addition, the current fixed UCG solution has several other shortcomings. First, 3GPP specifies a maximum Transport Block Size (TBS) of 128 bytes under the configured grant process. With a maximum of 2 slots per system frame in radio frequency band n77, the maximum throughput using forty-five resource blocks (RB) is about 700 kbps with Modulation Code Scheme MCSO and one-layer non-MIMO transmission. Because many URLLC services require data rate between 1 Mbps and 10 Mbps, the UCG feature under the current specification cannot support any of URLLC services.

Further, because 3GPP configured grant procedure always uses MCSO with one-layer transmission, it results in the lowest spectrum efficiency. In reality, the URLCC throughput and spectrum efficiency could be much higher when the URLCC users are in areas of good radio conditions. The static configured grant process results in reduced efficiency in use of radio resources.

Still further, because the 3GPP configured grant resources are reserved whether URLLC users exist or not, a network with UCG enabled may lose up to 25% of uplink (UL) radio resources. Non-URLLC users are the most significantly, negatively impacted by this inefficiency. Also, because the 3GPP configured is scheduled on the fixed uplink slots, it will impede the operation of energy saving features such as Connected Discontinuous Receive (CDRX). In the worst case, the battery life-saving feature of a device with CDRX won't ever be triggered when UCG is active.

As a result of these noted limitations, the URLLC feature of 5G has been considered to have very limited application. Improvements are required to increase the ease and effectiveness of the use of URLLC. Such improvements may be obtained through use of dynamic UCG based on URLLC-aware trigger to satisfy the requirements of various URLLC services while eliminating the inefficient use of radio resources. This solution reduces waste of radio spectrum and improves throughput to some URLLC services that require it.

Figure 2B:
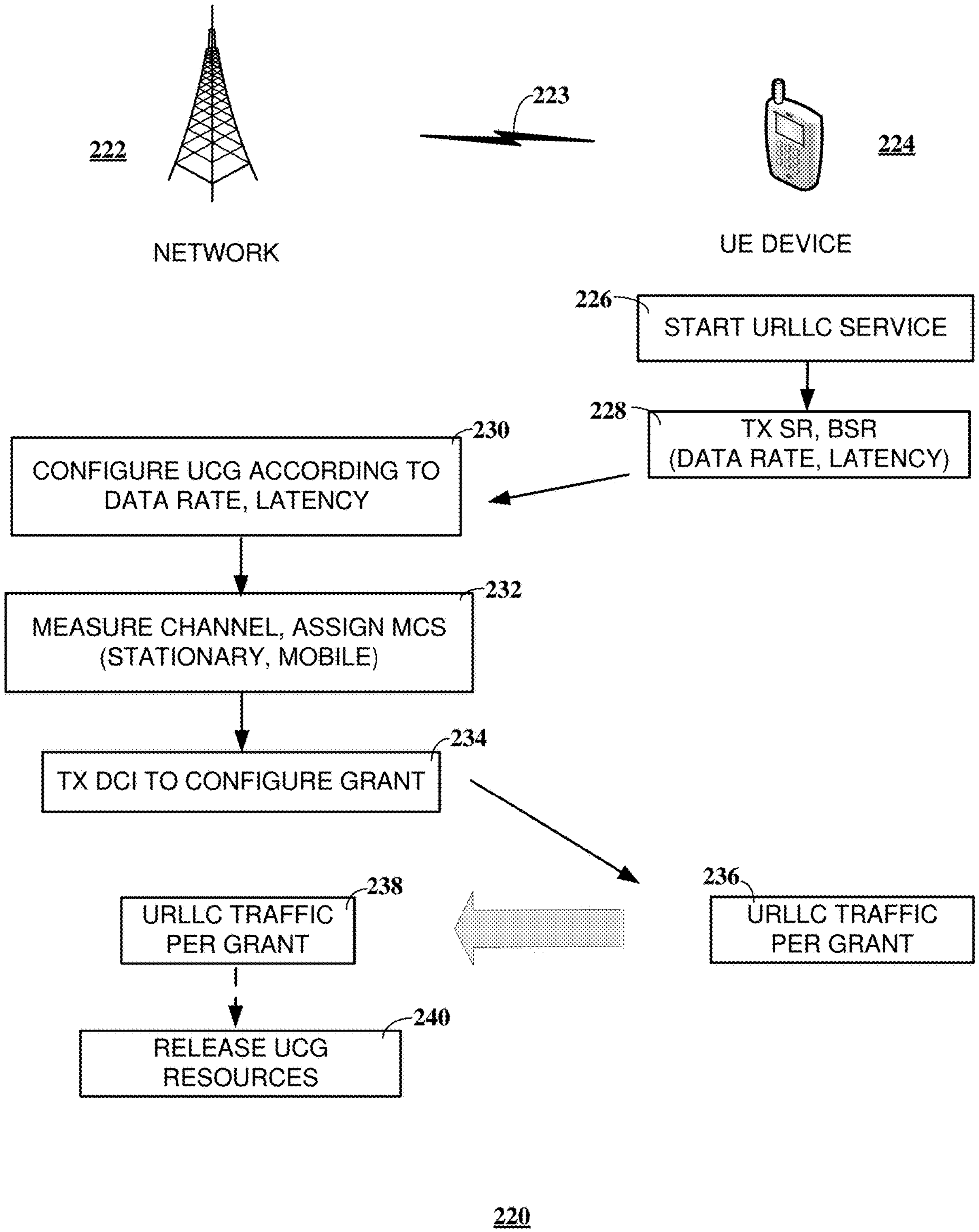
FIG. 2B depicts an illustrative embodiment of a method for use in a mobile communications system in accordance with various aspects described herein.

FIG. 2B depicts an illustrative embodiment of a method 220 in accordance with various aspects described herein. The method 220 may be used to control ultra-reliable and low latency communication (URLLC) of information in a mobile communications system. In particular, the method 220 may be used as part of a dynamic grant procedure for a configured grant of radio resources according to a particular requirement at a particular time.

In an example application, a network device 222 communicates over a radio access network with a user equipment (UE) device 224. The network device 222 may be a base station element such as an eNodeB or eNB in an LTE or 4G mobile network. In other examples, the network device 222 may be a base station element such as a gNodeB or gNB in a 5G mobile network. The network device 222 provides data communication over a radio link 223 between the mobile network and the UE device. The mobile network may provide handoff from radio communication with the network device 222 to other similar network devices as well as provide data communication to, for example, a core network with data communication access to the public internet. The UE device 224 may be any device capable of radio communication with the network device such as a smartphone, tablet computer, personal computer, and others. Radio communication between the network device 222 and the UE device on the radio link 223 may be according to an air interface standard such as the standards published by the 3rd Generation Partnership Project (3GPP) for controlling communication among such devices.

In the example, the UE device 224 may be used during provision or performance of URLLC services. For example, URLLC services may refer to using the mobile network for mission-critical applications that require uninterrupted and reliable data exchange. Short-packet data transmission may be used to meet both reliability and latency requirements of the wireless communication networks. Examples of URLLC services include public safety, telemedicine including remote diagnosis and treatment, emergency response, autonomous driving, industrial automation and power transmission. Such examples may require latency on the order of 1 ms and 99.999% reliability. In such applications, the UE device 224 may be embodied in or as part of medical equipment, industrial or manufacturing equipment, a vehicle, or any other suitable device requiring URLLC service in connection with its operation during provision of URLLC services.

At step 226, the UE device 224 or equipment including the UE device, begins the URLLC service. For example, a communication link including the radio link 223 may be initiated between medical equipment including a first medical device at a first medical facility, over the radio link 223 to the network device 222 and to facilities of the mobility network, and ultimately to counterpart second medical device among medical equipment at a second medical facility. In addition to the radio link 223 and the network including the network device, any other combination of networks including private networks and portions of the public internet may be used for traffic between the first medical device and the second medical device Proper operation requires high reliability and low latency communications, so the service may be termed a URLLC service. In another example, a first autonomous vehicle incorporating the UE device 224 begins operation and communicates with other autonomous vehicles nearby using facilities of a mobile network including the network device 222. To coordinate safe movement and interaction, the autonomous vehicles require communication that is highly reliable and of very low latency, making this coordination a URLLC service. The URLLC service may be implemented by an application program running on the UE device 224, or as part of an application program running on equipment used to perform the URLLC service, such as a vehicle.

At step 228, the UE device transmits a Scheduling Request (SR) and a Buffer Status Report (BSR) to the network to reserve resources for communication with the network related to the URLLC service. The SR generally is a physical layer message by which the UE device asks the network including the network device 222 to send an uplink grant so that the UE device 224 can transmit on the physical uplink shared channel (PUSCH). The format and content of the SR, as well as timing of its transmission, may be conventional as defined in one or more specifications published and updated by 3GPP. In other examples, the SR may be modified for a particular URLLC dynamic grant procedure in accordance with some aspects described herein. The BSR is a message from the UE to the network through the network device 222 advising of an amount of data to be transmitted by the UE and requesting a grant suitable to transmit the data according to requirements of the URLLC service. In examples, the BSR can be used by the UE device 224 to inform the network of the amount of data in an uplink buffer of the UE device 224 for transmission to the network. The format and content of the BSR may be conventional as defined in one or more specifications of published and updated by 3GPP. In other examples, the BSR may be modified for a particular URLLC dynamic grant procedure in accordance with some aspects described herein.

In accordance with aspects described herein, in the method 220, the SR and the BSR are transmitted a single time, at the initiation of a request for configured grant for dynamic URLLC service by the UE device 224. Content or format of the SR or the BSR may be modified to indicate a request for a dynamic uplink configured grant. In particular, the SR, BSR or both may specify required communication parameters for the configured grant, including for example, the required minimum data rate or a maximum latency for the URLLC service initiated at step 226. For example, a URLLC application operating on the UE device 224 may specify required key performance indicators, such as a minimum data rate for the URLLC service or a maximum latency for the URLLC service, or both. Further, the application may specify an amount of data required for transmission by the URLLC. Such information may be included in the SR or BSR, or both, to inform the network through the network device 222 of requirements of the URLLC service.

At step 230, the network operates to configure the uplink grant according to the request received at step 228 from the UE device 224. The operations of step 230, step 232 and step 234 may be performed at any suitable location or combination of locations in the communication network associated with the network device 226, such as a core network component. Such locations or combinations are simply referred to here as "the network" to simplify and clarify the discussion.

At step 230, the network can assess how many resources and what particular resources are to be assigned to the UE device for the received request. For example, the network may be receiving multiple dynamic grant requests from multiple UE devices at about the same time and must prioritize response to the requests. Generally, only a single dynamic configured grant request is processed at any particular time in order to consolidate resources and limit wasted network resources. In another example, the network may not have sufficient resources to satisfy the request, because of current network traffic conditions, radio environment conditions, and other factors. In general, the network selects and assigns a frequency or channel and a time slot, or other features in the frequency domain and the time domain, for the configured grant for the UE device 224.

At step 230, the network can configure a dynamic uplink configured grant (UCG) for the UE 224. The dynamic UCG may be considered dynamic because the parameters of the UCG are selected for the particular UE 224 in response to the particular SR and BSR received at the network. Thus, the UE 224 operating at another time according to a different URLLC service may require different parameters for the dynamic UCG. Similarly, a different UE device 224 may require different parameters for a different URLLC service. For example, the UE device 224 that controls an autonomous vehicle and requires extremely short latency of 2 ms may have different requirements from a UE device 224 which controls an industrial process and can accept 5 ms latency. While latency and data rate are illustrated as components of a dynamic uplink configured grant (dynamic UCG), any other suitable parameters for managing communication by the UE device may be specified in the dynamic uplink configured grant as well.

At step 232, the network measures the radio channel between the UE device 224 and the network device 222. The radio channel is defined by a number of parameters which characterize the radio environment of the UE device 224. Any suitable parameters may be measured, such as channel noise levels, channel power, signal to noise ratio, adjacent channel power, and others. The channel measurement may be used to select a Modulation Code Scheme (MCS) value for the dynamic UCG for the UE device. In an example, the MCS may be selected as an MCS index from a list of modulation schemes and coding schemes that are currently used to send data from network devices such as the UE device 224. Modulation schemes are different modulation methods used by each radio to encode data onto a radio signal before transmission. The channel measurement and other information gathering may be done during the time the UE is communicating the SR and BSR information. The channel measurement may be completed in part through cooperation with the UE device 224 such as communication from the UE device 224 to the network device 222 of measured values determined at the UE device 224.

One exemplary application for the dynamic UCG process of FIG. 2B is a 5G system. In a 5G system, specific 5G quality of service (QoS) Identifier (5QI) values are defined to standardize QoS characteristics. The 5QI value corresponds to a set of QoS characteristics that should be used for the radio channel. These characteristics include guaranteed and maximum bit rates, priority levels, and limits on latency, jitter, and error rate. Thus, in the example of FIG. 2B, the 5QI value may be established based on the latency and data rate specified for the dynamic UCG for the UE device 224. Table 1 illustrates MCS values defined for selected 5QI values. The MCS values are designated as "default priority level" in Table 1. Thus, a 5QI value of 82 corresponds to an MCS value of 19. Further, Table 1 provides example URLLC services for which a particular 5QI value and a particular default priority level or MCS value may be selected. Thus, the 5QI value of 82 and the MCS value of 19 may be appropriate for a discrete automation service requiring URLLC communications. In another example from Table 1, Vehicle to Everything (V2X) messages such as advanced collision avoidance messaging, may be specified with a 5QI value of 86 and a default priority level or MCS value of 18. For this example, the specified packet delay if 5 ms and the specified error rate is 10-4.

TABLE 1

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 82 | Delay-critical | 19 | 10 ms (NOTE 4) | $10^{-4}$ | 255 bytes | 2000 ms | Discrete Automation (see TS 22.261 [2]) |
| 83 | GBR | 22 | 10 ms (NOTE 4) | $10^{-4}$ | 1354 bytes (NOTE 3) | 2000 ms | Discrete Automation see TS 22.261 [2]): V2X messages (UE - RSU Platooning, Advanced Driving: Cooperative Lane Change with low LoA. See TS 22.186 [111], TS 23.287 [121]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 6) | $10^{-5}$ | 255 bytes | 2000 ms | Electricity Distribution-high voltage (see TS 22.261 [2]). V2X messages (Remote Driving. See TS 22.186 [111]. NOTE 16. see |

TABLE 1-continued

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| | | | | | | | TS 23.287 [121]) |
| 86 | | 18 | 5 ms (NOTE 6) | $10^{-4}$ | 1354 bytes | 2000 ms | V2X messages (Advaced Driving: Collision Avoidance, Platooning with high LoA. See TS 22.186 [111], TS 23.287 [121]) |

Also, in step 232, the network may determine if the UE device 224 is stationary or mobile. For example, a UE device 224 associated with a URLLC service for a medical procedure is fixed in a hospital or other medical environment. Similarly, a UE device associated with a URLLC service for an autonomous vehicle will likely be mobile a substantial portion of the time for performance of the URLLC service. Mobility can be determined in any suitable manner, including from stored information about the UE device 224. One example of such stored information is a record of handovers from one network element such as the network device 222 to another, or of time variation of channel characteristics measured for the UE device 224.

An appropriate MCS value may be selected for the dynamic UCG for the UE device 224 based on the measured channel, for example using information such as Table 1. If the network determines the UE device 224 is stationary while performing the URLLC service, the network will designate the selected MCS value from Table 1 as the assigned MCS value for the UE device. Generally, the assigned MCS value will be much higher than the MCS value of 0 used for conventional configured grant in 5G networks. The higher value of MCS may be selected based on knowledge of the radio channel characteristics at the time of the request for dynamic UCG. Further, the higher value of MCS may be selected based on awareness that the UE device 224 is stationary and is likely in a static or stable radio environment. The higher value of MCS will enable a much higher data throughput, including throughput values greater than 1 Mbps. This can be important for some URLLC services that require high throughput or high data rate but cannot achieve such values using the convention configured grant arrangement which fixes the MCS value for the uplink at MCS 0.

If, instead, the network determines the UE device 224 is a mobile device for at least part of the performance time of the URLLC service, the network will designate an MCS value that is more conservative than the selected value based on the 5QI value or other information. A more conservative value may be selected in order to mitigate requirements for retransmission by the UE device 224 in the event of short-term channel interference or other source of error. In one example, the assigned more conservative MCS value for the dynamic UCG for the UE device 224 is three points lower or a value corresponding to 3 dB less than the selected MCS value selected for the dynamic UCG for the UE device 224 based on the measured channel. In an example using Table 1, a 5QI value determined for the mobile UE device 224 corresponds to a MCS value of 24. Since the UE device 224 is determined to be mobile, step 232 includes assigning an MCS value of 21 to the UE 224 during the dynamic UCG process. Such a more conservative value is chosen to maintain a desired, relatively high throughput rate or data rate for the dynamic UCG while mitigating any increase in bit error rate due to mobility of the UE device 224 through a changing radio environment. If the UE device 224 moves into an area of high noise or a deep fade, the conservative MCS value will ensure that the data rate remains acceptable high while error rate remains low without requiring retransmission.

At step 234, the network formats and transmits a Downlink Control Information (DCI) response message for the UCG for the UE device 224. The DCI response is a response to the SR and BSR request messages from the UE device 224 to the network. The DCI response message provides the UE device 224 with the necessary information such as physical layer resource allocation, power control commands, duration of the dynamic configured grant, and other information such as assigned MCS value for both uplink and downlink.

Similar to the SR and BSR, the DCI transmission is the first DCI transmission encountered by the network and the UE device 224. Further SR, BSR and DCI messages are suppressed during the duration of the UCG given to the UE device 224. Only the first set of SR. BSR and DCI messages received at the beginning of the dynamic UCG interaction are used. In this manner, the dynamic UCG process will not add noticeable delay to a URLLC service. As indicated in FIG. 2A, substantial delay can result during initiation of the URLLC service using conventional UCG processes including conventional SR. BSR and DCI signaling.

The format of the SR, BSR and DCI messages may match the defined formatting and content according to 3GPP standards. If appropriate, the format or content of the SR. BSR or DCI messages may be modified to accommodate different information used in the dynamic UCG process exemplified in FIG. 2B. For example, the SR message may include radio link measurement information determined by the UE device 224 and required by the network for MCS determination and assignment at step 232.

At step 236 and step 238, the UE device 224 and the network device 222 exchange uplink traffic according to the dynamic uplink configured grant. The exchanged traffic is part of the URLLC service. In some aspects, the dynamic UCG parameters are selected specifically for this traffic for the URLLC service. For example, if this particular URLLC service is performed using a stationary device, or in a quiet radio environment, the MCS value is selected to accommodate that value and provide the required throughput and latency. The UE device 224 and the network device 222 will continue communicating the URLLC service data throughout the assigned duration of the dynamic UCG grant. At step 240, the UCG resources are released for subsequent use by other network devices.

The system and method for implementing a dynamic uplink configured grant in accordance with aspects described herein provides many benefits, particularly relative to the conventional 5G configured grant process. For example, the dynamic UCG process described herein eliminates the unused, reserved URLLC resources associated with the conventional 5G UCG processes. Such otherwise-wasted resources are now available to share with non-UCG users when no URLLC traffic is on the network. Further, the spectrum efficiency during URLLC traffic is improved by dynamically selecting a higher MCS value selected for the current radio conditions instead of a fixed MCS 0 value. The critical connected mode discontinuous receive (CDRX) feature can operate under the dynamic UCB when no URLLC service is active and thereby reduce energy consumption in the radio of the UE device 224 and thus preserve UE battery. Still further, the dynamic UCG process satisfies the data rate and latency requirements of diverse URLLC services. The parameters of the uplink configured grant can be specifically, dynamically selected for a particular UE device, performing a particular URLLC service, at a particular time in a particular radio environment. This provides substantially more flexibility than the static 5G UCG process could ever afford.

While for purposes of simplicity of explanation, the respective processes are shown and described as a series of blocks in FIG. 220, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
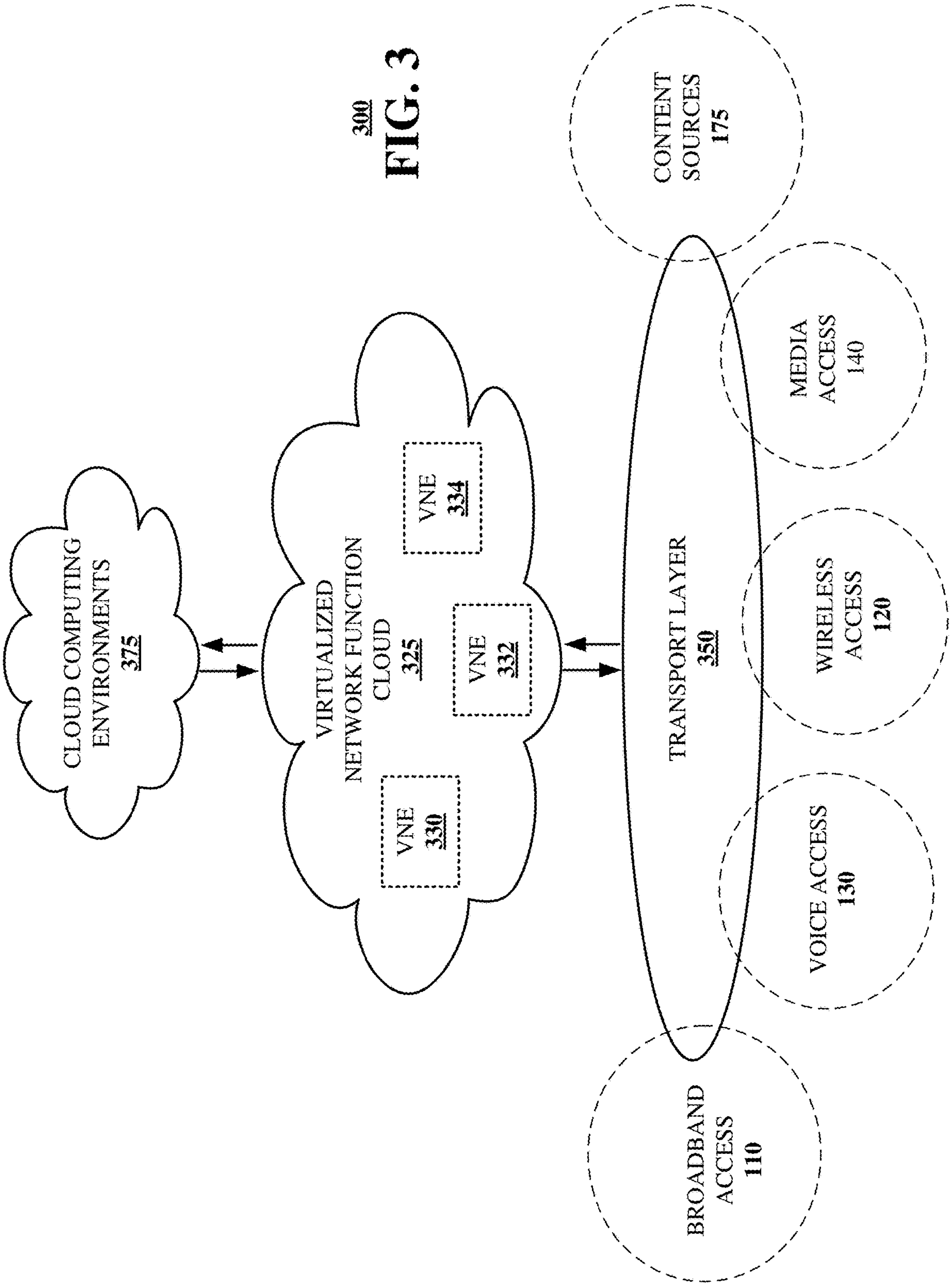
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network 300 is presented that can be used to implement some or all of the subsystems and functions of system 100, the subsystems and functions of system 200, and method 230 presented in FIG. 1, FIG. 2A, FIG. 2B, and FIG. 3. For example, virtualized communication network 300 can facilitate in whole or in part to provide URLLC services at a device such as medical equipment or a vehicle operated in conjunction with a mobile device in communication with the virtualized communication network 300.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
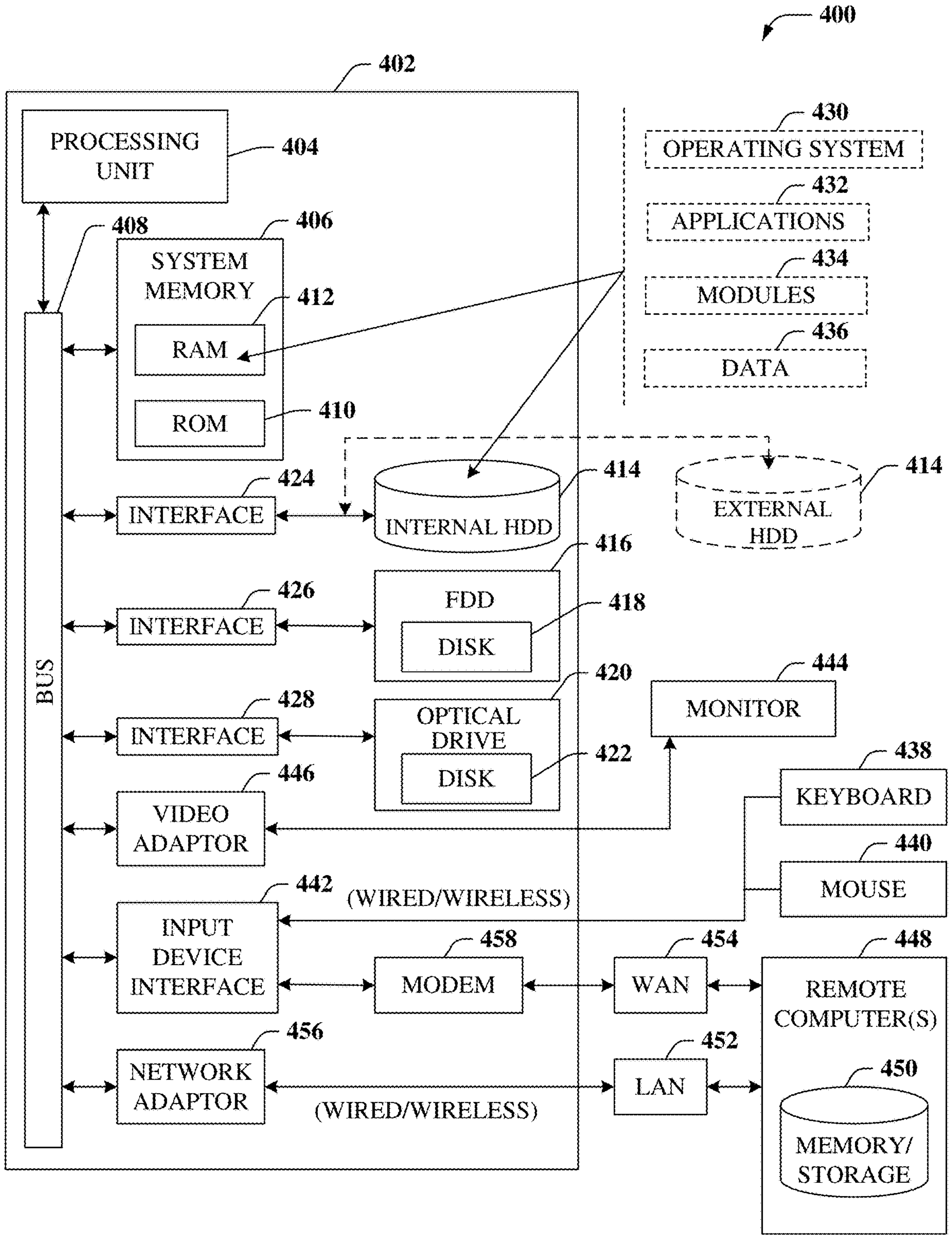
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing URLLC services at a device operated in conjunction with a UE device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
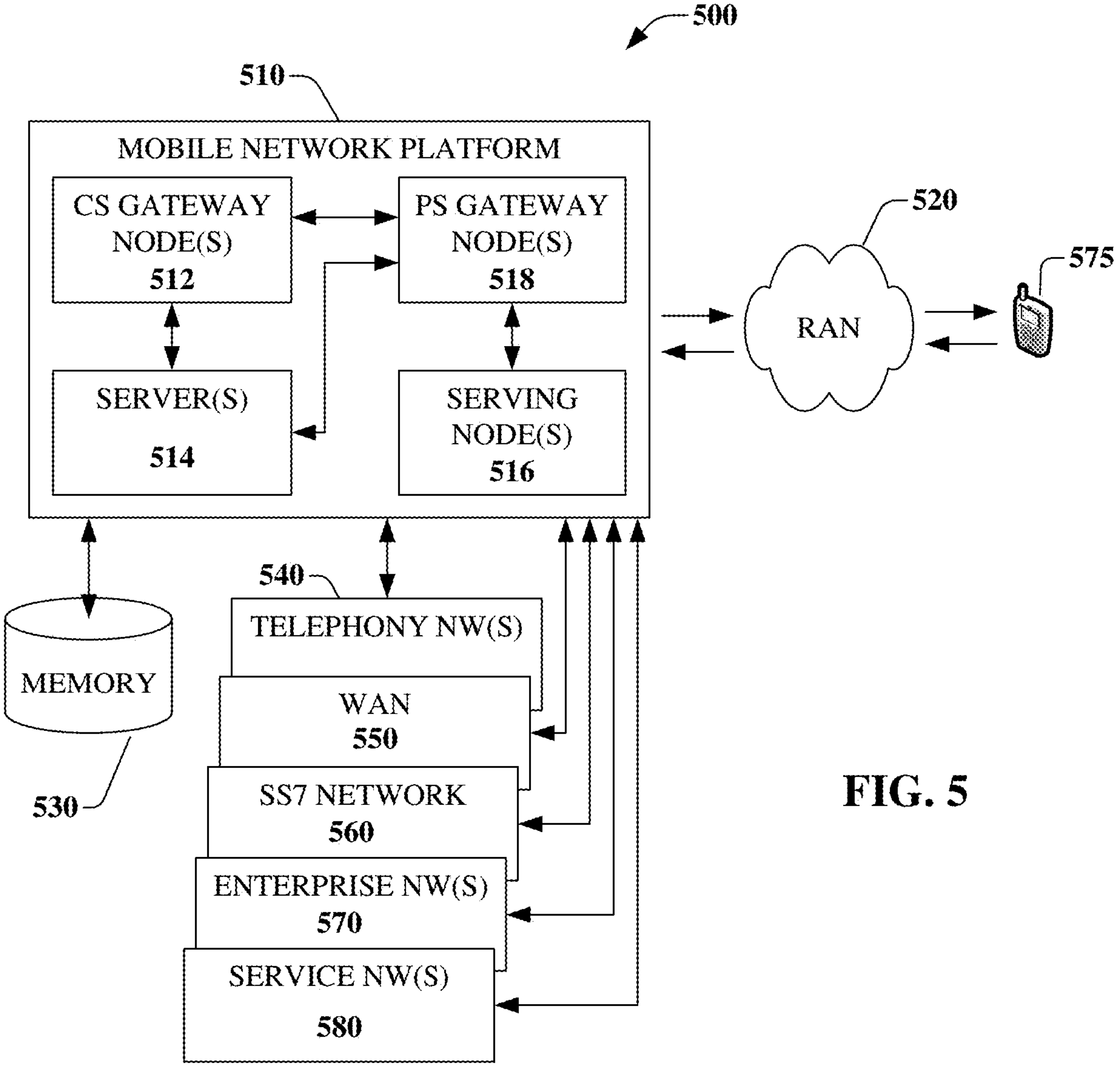
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing communication services associated with a URLLC service being provided at a device such as a vehicle or medical equipment. The device may be operated in conjunction with devices, such as a smartphone or radiotelephone 575 In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter. FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
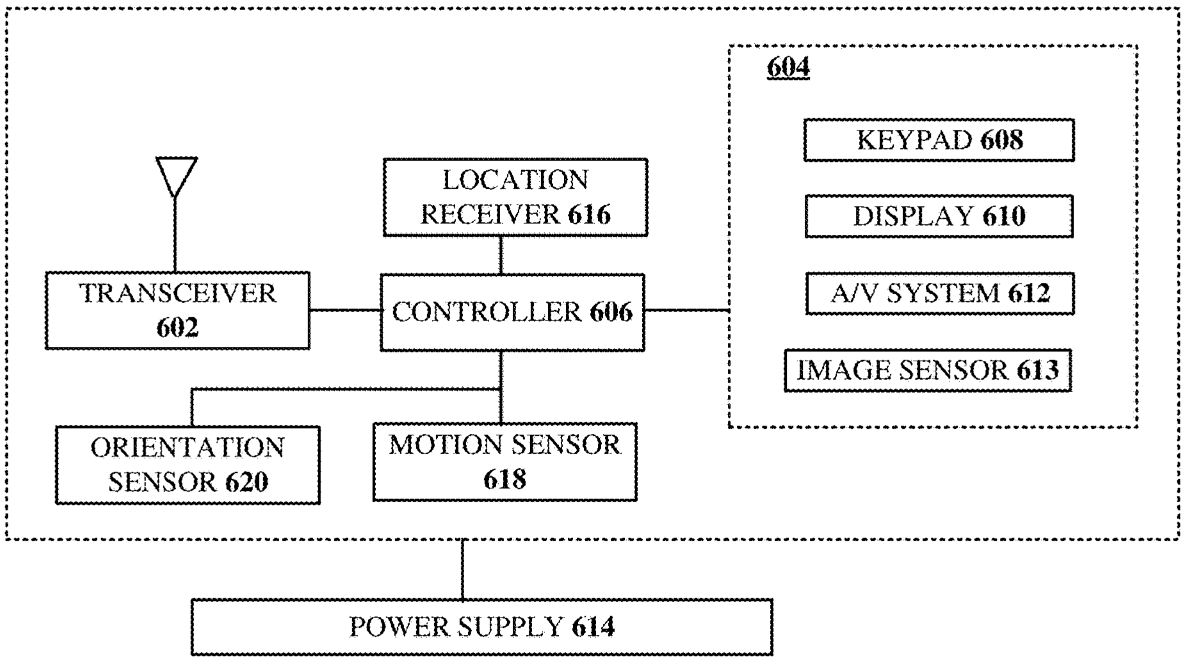
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part communicating control data and user data associated with a URLLC service. The communication device 600 may be configured as described herein for URLLC communication at high throughput for providing a particular URLLC service at a particular time.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving, from a user equipment (UE) device, a scheduling request for a configured grant operation during performance of an ultra-reliable low latency communications (URLLC) service at the UE device;

determining radio channel characteristics of a radio channel of the UE device;

determining an appropriate modulation and coding scheme for a dynamic configured grant for the UE device, wherein the appropriate modulation and coding scheme is selected based on the radio channel characteristics, wherein the determining the appropriate modulation and coding scheme for the dynamic configured grant comprises:

determining a set of quality of service (QoS) characteristics that should be used for the radio channel, wherein the determining the set of QoS characteristics is based on the scheduling request for the configured grant operation; and based on the set of QoS characteristics, selecting the appropriate modulation and coding scheme for the dynamic configured grant, forming a selected modulation and coding scheme;

communicating information about the dynamic configured grant to the UE device, including communicating an assigned modulation and coding scheme to the UE device for use during performance of the URLLC service at the device; and suspending further scheduling requests for additional dynamic configured grants during completion of the URLLC service at the device.

2. The device of claim 1, wherein the operations further comprise:

assigning resources to the dynamic configured grant, wherein the assigning resources is based on the scheduling request; and releasing the resources following completion of the URLLC service at the device.

3. The device of claim 2, wherein the assigning resources to the dynamic configured grant comprises:

assigning a data rate for uplink communication by the UE device during the performance of the URLLC service at the service; and assigning a latency for the uplink communication by the UE device during the performance of the URLLC service at the service.

4. The device of claim 1, wherein the operations further comprise:

receiving from the UE device one or more of a required minimum data rate and a maximum latency for uplink radio communication by the UE device during provision of the URLLC service at the device.

5. The device of claim 1, wherein the operations further comprise:

receiving, from the UE device, a buffer status report with the scheduling request;

transmitting, to the UE device, a downlink control information response message that configures the dynamic configured grant; and during a duration of the dynamic configured grant, refraining from receiving further buffer status report messages and refraining from transmitting additional downlink control information messages.

6. The device of claim 1, wherein the operations further comprise:

identifying the UE device as a mobile device or a stationary device; and based on an identification of the UE device as a mobile device, adjusting the selected modulation and coding scheme to mitigate required retransmission of uplink data during the performance of the URLLC service at the UE device.

7. The device of claim 1, wherein the adjusting the selected modulation and coding scheme comprises:

adjusting the selected modulation and coding scheme to a value three points lower than the selected modulation and coding scheme, forming an assigned modulation and coding scheme; and communicating the assigned modulation and coding scheme to the UE device for use during the dynamic configured grant.

8. The device of claim 1, wherein the operations further comprise:

assigning the selected modulation and coding scheme for use by the UE device during the dynamic configured grant, forming an assigned modulation and coding scheme; and communicating the assigned modulation and coding scheme to the UE device for use during the dynamic configured grant.

9. The device of claim 1, wherein the device comprises a vehicle.

10. The device of claim 1, wherein the device comprises medical equipment.

11. A non-transitory machine-readable medium, comprising executable instructions that, when executed by a processing system including a processor, facilitate performance of operations, the operations comprising:

identifying a start of provision of an ultra-reliable low latency communications (URLLC) service at equipment associated with a UE device, the UE device in radio communication with a network;

receiving, from the UE device over a radio link, a buffer status report and a scheduling request for a dynamic configured grant for extended uplink communication from the UE device to the network;

suspending communication of further buffer status report messages and further scheduling request messages during provision of the URLLC service at the equipment associated with the UE device;

determining an appropriate modulation and coding scheme for the dynamic configured grant for the UE device, wherein the appropriate modulation and coding scheme is selected based on radio channel characteristics of the radio link, wherein the determining the appropriate modulation and coding scheme for the dynamic configured grant comprises:

determining a set of quality of service (QoS) characteristics appropriate for the radio link, wherein the determining the set of QoS characteristics is based on the one or more of a required minimum data rate and a maximum latency; and based on the set of QoS characteristics, selecting the appropriate modulation and coding scheme for the dynamic configured grant, forming a selected modulation and coding scheme; and communicating, to the UE device, information about a data rate and a latency for use on uplink communications during the dynamic configured grant, including communicating an assigned modulation and coding scheme to the UE device for use during performance of the URLLC service at the equipment associated with the UE device.

12. The non-transitory machine-readable medium of claim 11, wherein the operations further comprise:

assigning a data rate for uplink communication by the UE device during the performance of the URLLC service at the equipment associated with the UE device, forming an assigned data rate;

assigning a latency for the uplink communication by the UE device during the performance of the URLLC service at the equipment associated with the UE device, forming an assigned latency; and communicating the assigned data rate and the assigned latency to the UE device.

13. The non-transitory machine-readable medium of claim 11, wherein the determining the appropriate modulation and coding scheme for the dynamic configured grant comprises:

receiving from the UE device one or more of a required minimum data rate and a maximum latency for uplink radio communication by the UE device during the provision of the URLLC service at the equipment associated with the UE device.

14. The non-transitory machine-readable medium of claim 13, wherein the operations further comprise:

identifying the UE device as a mobile device or a stationary device; and based on an identification of the UE device as a mobile device, adjusting the selected modulation and coding scheme to mitigate required retransmission of uplink data during the performance of the URLLC service at the equipment associated with the UE device.

15. The non-transitory machine-readable medium of claim 14, wherein the adjusting the selected modulation and coding scheme comprises:

adjusting the selected modulation and coding scheme to a value three points lower than the selected modulation and coding scheme, forming an assigned modulation and coding scheme; and communicating the assigned modulation and coding scheme to the UE device for use during the dynamic configured grant.

16. The non-transitory machine-readable medium of claim 14, wherein the operations further comprise:

assigning the selected modulation and coding scheme for use by the UE device during the dynamic configured grant, forming an assigned modulation and coding scheme; and communicating the assigned modulation and coding scheme to the UE device for use during the dynamic configured grant.

17. A method, comprising:

initiating, by a processing system including a processor, a start of provision of an ultra-reliable low latency communications (URLLC) service at equipment associated with a UE device, the UE device in radio communication with a network;

communicating, by the processing system, from the UE device over a radio link to a network device, a scheduling request for a dynamic configured grant for extended uplink communication from the UE device to the network during the provision of the URLLC service at the equipment associated with the UE device;

transmitting, from the UE device, one or more of a required minimum data rate and a maximum latency for uplink radio communication by the UE device during the provision of the URLLC service at the equipment associated with the UE device;

receiving, by the processing system, at the UE device, information about a data rate and a latency for use on uplink communications over the radio link during the dynamic configured grant, including receiving an assigned modulation and coding scheme for the UE device for use during performance of the URLLC service at the equipment associated with the UE device, wherein the assigned modulation and coding scheme is selected based on current radio characteristics of the radio link; and communicating, by the processing system, on an uplink to the network device over the radio link according to the information about a data rate and a latency, during the provision of the URLLC services at the equipment associated with the UE device.

18. The method of claim 17, comprising:

receiving, by the processing system, an assigned modulation and coding scheme for use by the UE device during the dynamic configured grant, wherein the assigned modulation and coding scheme is adjusted based on an identification of the UE device as a mobile device, the adjusting to mitigate required retransmission of uplink data by the UE device during the performance of the URLLC service at equipment associated with the UE device.

19. The method of claim 17, wherein receiving the information about the data rate and the latency for use on uplink communications comprises:

receiving, by the processing system, dynamically selected information about the data rate and the latency, the dynamically selected information selected at the network for the UE device during provision of the URLLC service at the equipment, for current radio characteristics of the radio link.

20. The method of claim 17, comprising:

determining, by the processing system, an end to uplink communication of traffic related to the provision of the URLLC service; and releasing, by the processing system, assigned resources for the dynamic configured grant for extended uplink communication from the UE device to the network, wherein the releasing assigned resources is responsive to the determining the end to uplink communication of traffic related to the provision of the URLLC service.

* * * * *